United States Patent
Yu (10) Patent No.: US 6,795,821 B2
(45) Date of Patent: Sep. 21, 2004

(54) DATABASE SYSTEMS, METHODS AND COMPUTER PROGRAM PRODUCTS INCLUDING PRIMARY KEY AND SUPER KEY INDEXES FOR USE WITH PARTITIONED TABLES

(75) Inventor: Lin Yu, Fort Lauderdale, FL (US)

(73) Assignee: Trendium, Inc., Fort Lauderdale, FL (US)

(*) Notice: Subject to any disclaimer, the term of this patent is extended or adjusted under 35 U.S.C. 154(b) by 329 days.

(21) Appl. No.: 09/907,333

(22) Filed: Jul. 17, 2001

(65) Prior Publication Data

US 2003/0055822 A1 Mar. 20, 2003

(51) Int. Cl.$^7$ ............................................. G06F 17/30
(52) U.S. Cl. ............................... 707/3; 707/2; 707/10; 707/201
(58) Field of Search ................................ 707/2, 4, 6, 10, 707/100, 101, 103, 201, 1, 3, 5, 7, 8, 9, 102, 103 R, 104, 200, 202, 203; 705/8, 400; 709/201, 203, 207, 218, 219, 224, 225, 228, 231, 23

(56) References Cited

U.S. PATENT DOCUMENTS

| | | | |
|---|---|---|---|
| 5,548,749 A | 8/1996 | Kroenke et al. | ............ 395/600 |
| 5,551,027 A * | 8/1996 | Choy et al. | ................. 707/201 |
| 5,870,746 A | 2/1999 | Knutson et al. | ............ 707/101 |
| 5,960,194 A | 9/1999 | Choy et al. | ................. 395/613 |
| 6,003,036 A | 12/1999 | Martin | ....................... 707/102 |
| 6,014,656 A * | 1/2000 | Hallmark et al. | .............. 707/2 |
| 6,035,300 A * | 3/2000 | Cason et al. | ................ 707/102 |
| 6,223,182 B1 | 4/2001 | Agarwal et al. | ............ 707/102 |

OTHER PUBLICATIONS

Leverenz et al. "Oracle8I Concepts, Chapter 11: Partitioned Tables and Indexes, Release 8.1.5, Part No. A67781," *Oracle8I Concepts*, Feb. 1999.

Blaha et al. "Teaching database reverse engineering," *2000 IEEE*.

S. Konomi, "Embedded materialized views: bridging physical and computational worlds for long–term collaboration," *Database Applications in Non–Traditional Environments, Proceedings 1999 International Symposium on Kyoto, Japan*. Nov. 28–30, 1999.

International Search Report for PCT Application No. PCT/US02/22641, Mar. 24, 2003.

* cited by examiner

*Primary Examiner*—Shahid Alam
*Assistant Examiner*—Fred Ehichioya
(74) *Attorney, Agent, or Firm*—Myers Bigel Sibley & Sajovec, P.A.

(57) ABSTRACT

Database systems, methods and/or computer program products that include a database management system and a database having partitioned tables. The partitioned tables include at least two entity tables and a relationship table where the relationship table has a child-to-parent relationship to each of the entity tables. Keys and indices are defined for the entity tables and the relationship table so that the database management system maintains referential integrity between the relationship table and the entity tables to thereby enforce the child-parent relationship. The keys and indices include a primary key which includes one or more columns of a corresponding entity table. The columns of the primary key, however, does not include columns which are used only for partitioning the entity table. A super key includes the columns of the primary key of a corresponding entity table and one or more columns of the entity table which are used only for partitioning the entity table A super key index of the corresponding entity table is based on the super key. Foreign keys are defined for the relationship table corresponding to the primary keys of the entity tables which are related by the relationship table.

26 Claims, 5 Drawing Sheets

|  | Table A | Table B | Table C |
|---|---|---|---|
| Primary Key | a | b | (a,b) |
| Primary Index | a | b | (a,b) |
| Foreign Keys |  |  | (a,b) |

Figure 1

|  | Table A | Table B | Table C |
|---|---|---|---|
| Primary Key | (a,d) | (b,e) | (a,b,f) |
| Primary Index | (a,d) | (b,e) | (a,b,f) |
| Foreign Keys |  |  | (a,f),(b,f) |

|  | Table U | Table V | Table W |
|---|---|---|---|
| Primary Key | u | v | (u,v,z) |
| Primary Index |  |  | (u,v,z) |
| Super Key Index | (u,x) | (v,y) |  |
| Foreign Keys |  |  | u,v |

Figure 6

DATABASE SYSTEMS, METHODS AND COMPUTER PROGRAM PRODUCTS INCLUDING PRIMARY KEY AND SUPER KEY INDEXES FOR USE WITH PARTITIONED TABLES

FIELD OF THE INVENTION

This invention relates to data processing systems, methods and computer program products, and more particularly to database systems, methods and computer program products.

BACKGROUND OF THE INVENTION

Database systems, methods and computer program products are widely used for information management. More specifically, database systems, methods and computer program products may be used to reliably manage a large amount of data in a multi-user environment, so that many users can concurrently access the same data. Database systems, methods and computer program products generally include a database that actually stores the data, a database management system and one or more applications that interface with the database management system to provide, for example, user interfaces and other applications.

One widely available database system is the Oracle8i database system that is marketed by Oracle Corporation and that is described, for example, in publications entitled *Oracle8i Concepts, Release* 8.1.5, February 1999, *Part No. A67781-01*, 1999, and *Oracle8i Administrator's Guide, Release* 8.1.5, February 1999, *Part A67772-01*, 1999. The disclosures of both of these publications are hereby incorporated herein by reference in their entirety. The design and operation of database systems, methods and computer program products are well known to those having skill in the art, and need not be described further herein.

At a high level, a relational database may be considered as consisting of a set of tables. Each table typically includes a set of columns (fields). Each table also typically includes a "primary key." A primary key is a column which uniquely identifies each record in a table or a set of its columns whose combined values uniquely identify each record in that table. To speed up query searching, conventionally an index is built on the primary key of each table. An index that is based on a primary key column (or columns) is often called a primary key index, or primary index for short.

A "super key" is conventionally obtained by combining a column or columns to a primary key. An index built on a super key is typically referred to as a super key index. Because a super key contains a column or proper subset of columns whose values can be used to uniquely identify each record, the values of the super key can also be used to uniquely identify each record.

If a table includes non-primary-key columns, i.e. a column or columns that by themselves collectively cannot uniquely identify records in that table, whose values are used to identify records in other tables by matching the primary key values in the other tables, these columns are typically referred to as a foreign key. Often indices are built on the foreign key columns of a table, and these indices are referred to as foreign key indices.

A table having a foreign key may be considered a "child table" of the table or tables to which the foreign key points. A table which is pointed to by a foreign key or keys from another table may be considered a "parent table" of the other tables. The validity of a record in a child table with a foreign key or keys typically depends on the existence of records in all of its parent tables to whom foreign key values of a record point. The referential integrity constraints between parent and child tables are enforced by a database management system that typically attempts to enforce the constraint that the foreign key of each child record must point to a parent record.

Figure 1:
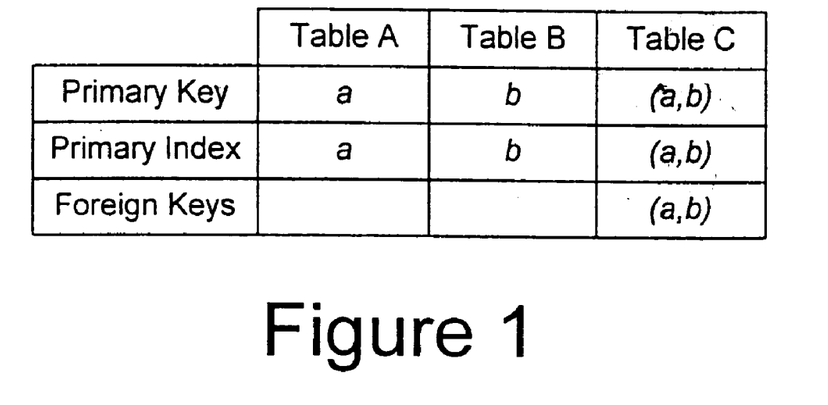
FIG. 1 is an illustration of conventional table keys and indexes for three tables having a parent and child relationship.

In relational database design, real world entities are normally modeled by entity tables, i.e., each of these entity table models, or represents, a class of real world entities. Between two entity tables the relationship is often many-to-may, meaning that each record in each of the two entity tables can relate to more than one record in the other entity table. Typically, the maximum granularity of the number of such associations for each given record is not fixed in advance. There are many ways to represent a many-to-many relationship between two entity tables. One conventional way is to define another table, called a "relationship table," whose primary key includes both the primary keys of the two entity tables it relates. One such example is illustrated in FIG. 1, where Table A and Table B are entity tables with primary keys a and b, respectively, and Table C is a relationship table. Table C has a primary key which includes the primary keys a and b of Tables A and B and has a primary index based on those primary keys. Also Table C has foreign keys a and b and, therefore, is considered a child table of both Table A and Table B such that foreign keys of each record in Table C point to a record in Table A and a record in Table B.

For very large database systems (VLDB), for the purpose of improving performance, table partitioning is often used to manage data with sizes in the range of, for example, multi-gigabytes to multi-terabytes. For example, in the service management systems deployed by service providers, very large quantities of quality of service (QOS) statistics may be continuously collected 24 hours a day, 7 days a week, 365 days a year. This very large quantity data may be stored in a VLDB, and managed by a database management system (DBMS). This data typically may be concentrated in very few data tables. To achieve higher performance for data manipulation and query operations, often these tables are partitioned into smaller sub-partitions.

Partitioning is described in the above-cited *Oracle8i Concepts* publication at Chapter 11, entitled *Partitioned Tables and Indexes*. Partitioning also is described in the above-cited *Oracle8i Administrator's Guide* at Chapter 13, entitled *Managing Partitioned Tables and Indexes*. As described therein, partitioning can address the problem of supporting very large tables and indexes by allowing the tables to be decomposed into smaller and more manageable pieces called partitions. Partitioned tables or indexes can be divided into a number of pieces, called subpartitions, which have the same logical attributes. For example, all partitions (or subpartitions) in a table share the same column and constraint definitions, and all partitions (or subpartitions) in an index share the same index option. Each partition (or subpartition) is stored in a separate segment, and can have different physical attributes. Usually, a partition scheme requires the use of some partition criteria to determine which partition (or sub-partition) of the table a record belongs. The values of some columns are usually used as partition criteria, where such columns must be included in a super key index of the table. The design and implementation of database partitioning is well known to those having skill in the art and need not be described in further detail herein.

Figure 2:
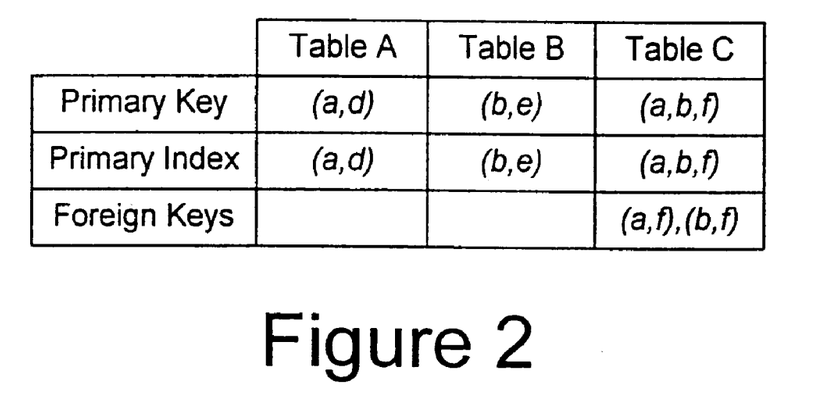
FIG. 2 is an illustration of conventional table keys and indexes for three tables which are partitioned.

FIG. 2 is an example of a partitioning of the tables of FIG. 1. In order to partition Tables A, B and C, conventionally, another set of columns are added to the primary key and primary index of each of the tables to be used as partition criteria of a partition scheme. As is further seen in FIG. 2, these three sets of columns are illustrated as d, e and f. Following the conventional primary key and index design practice, the key and index are designed to match each other. Thus, the foreign key (a,f) of Table C should match the primary index (a,d) of Table A and the foreign key (a,f) should also match the primary index (b,e) of Table B. However, because of the value discrepancy between d in Table A and e in Table B, in general, the values of column f in Table C can only be used to as a foreign key for one or the other of entries in Table A or Table B. Thus, the column f can be used together with a as foreign key to match (a,d) in Table A or together with b as a foreign key to match (b,d) in Table B, but not both. In other words, in this case, Table C cannot be a child of both Table A and Table B at the same time. Accordingly, in order to maintain the parent-child constraints imposed by the DBMS, one of the foreign key dependency declarations must be dropped. However, for whichever foreign key is dropped, the referential constraint may not be enforced by DBMS and the potential of having phantom children records may exist. The consistency, and therefore the correctness of data, may be compromised.

Since the DBMS may not enforce one of the two referential integrity constraints, such constraints could be explicitly enforced. However, explicitly enforcing the referential integrity constraints may result in increased development cost, increased system complexity, and increased run-time CPU overhead.

Accordingly, improvements are needed in the conventional practice of designing database keys and indices to support partitions and referential integrity constraints for very large tables that may have many-to-many relationships between them.

SUMMARY OF THE INVENTION

Embodiments of the present invention provide database systems, methods and/or computer program products that include a database management system and a database having a plurality of partitioned tables. The plurality of partitioned tables include at least two entity tables and a relationship table where the relationship table has a child-to-parent relationship to each of the entity tables. A plurality of keys and indices are defined for the entity tables and the relationship table so that the database management system maintains referential integrity between the relationship table and the entity tables to thereby enforce the child-parent relationship.

In further embodiments of the present invention, the plurality of keys and indices include a primary key of the relationship table includes one or more columns of a corresponding entity table. The columns of the primary key, however, do not include columns which are used only for the purpose of partitioning the entity table. A super key includes the columns of the primary key of a corresponding entity table and one or more columns of the entity table which are used only for the purpose of partitioning the entity table. A super key index of the corresponding entity table is based on the super key.

In additional embodiments of the present invention, the primary key includes a primary key corresponding to the relationship table which includes the primary keys of the entity tables and one or more columns of the relationship table used for partitioning the relationship table. A primary key index of the relationship table is based on the primary key corresponding to the relationship table. Additionally, the entries in the entity tables may have a many-to-many relationship with each other which is defined by entries in the relationship table. Also, the relationship table may further include a plurality of foreign keys, each foreign key corresponding to a primary key of one of the entity tables.

In particular embodiments of the present invention, the entity tables comprises network QOS information.

In further embodiments of the present invention, methods, systems and computer program products are provided for maintaining referential integrity between partitioned tables of a relational database. Primary keys of at least two entity tables of the relational database are defined so as to only include columns of the entity tables other than columns used only for the purpose of partitioning the respective entity tables of the at least two entity tables. Super keys of the entity tables of the relational database are also defined so as to include the respective primary keys and at least one column used only for the purpose of partitioning the respective entity tables. Super key indices are defined for the entity tables based on their respective super keys. A primary key of a relationship table associated with the entity tables is defined based on the combined primary keys of the entity tables and at least one column of the relationship table used for the purpose of partitioning the relationship table. A primary index of the relationship table is defined based on the primary key of the relationship table.

In further embodiments of the present invention, each of the entity tables is partitioned based on its column (or columns) used for the purpose of partitioning that is (or are) include in its (or their) super key (or keys) and super key index (or indices). Additionally, the relationship table may be partitioned based on its column (or columns) used for the purpose of partitioning that is (or are) included in its primary key and primary key index. Furthermore, entries in the entity tables may have a many-to-many relationship defined by entries in the relationship table. Foreign keys of the relationship table are defined to correspond to the primary keys of the entity tables related by the relationship table. The values of the foreign keys thus defined reference to the primary keys in their corresponding entity tables. Referential integrity between the entity tables and relationship table then is enforced by the foreign keys declared in the relationship table where the foreign keys are based on the primary keys declared in the entity tables.

Systems, methods and/or computer program products according to embodiments of the present invention may execute in a mainframe environment, and/or in a client/server environment and/or in distributed database environment. Finally, systems, methods and/or computer program products according to embodiments of the invention a may be used with any other database system that provides for partitioning of tables in a database, including Oracle databases as described above, Sybase, marketed by Sybase, Inc.; Informix, marketed by Informix Software, Inc.; Ingres marketed by Computer Associates International, Inc. and DB2, marketed by IBM Corporation. Improved performance, manageability, availability, configurability, flexibility, scaleability and/or maintainability thereby may be provided.

DETAILED DESCRIPTION OF PREFERRED EMBODIMENTS

The present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

As also will be appreciated by one of skill in the art, the present invention may be embodied as methods, data processing systems, and/or computer program products. Accordingly, the present invention may take the form of an entirely hardware embodiment, an entirely software embodiment running on general purpose hardware or an embodiment combining software and hardware aspects. Furthermore, the present invention may take the form of a computer program product on a computer-usable storage medium having computer-usable program code embodied in the medium. Any suitable computer readable medium may be utilized including hard disks, CD-ROMs, optical storage devices, a transmission media such as those supporting the Internet or an intranet and/or magnetic storage devices.

Computer program code for carrying out operations of the present invention may be written in an object oriented programming language such as JAVA®, Smalltalk or C++. The computer program code for carrying out operations of the present invention may also be written in conventional procedural programming languages, such as "C", or in various other programming languages. Software embodiments of the present invention do not depend on implementation with a particular programming language. Portions of the program code may execute entirely on one or more data processing systems.

Figure 3:
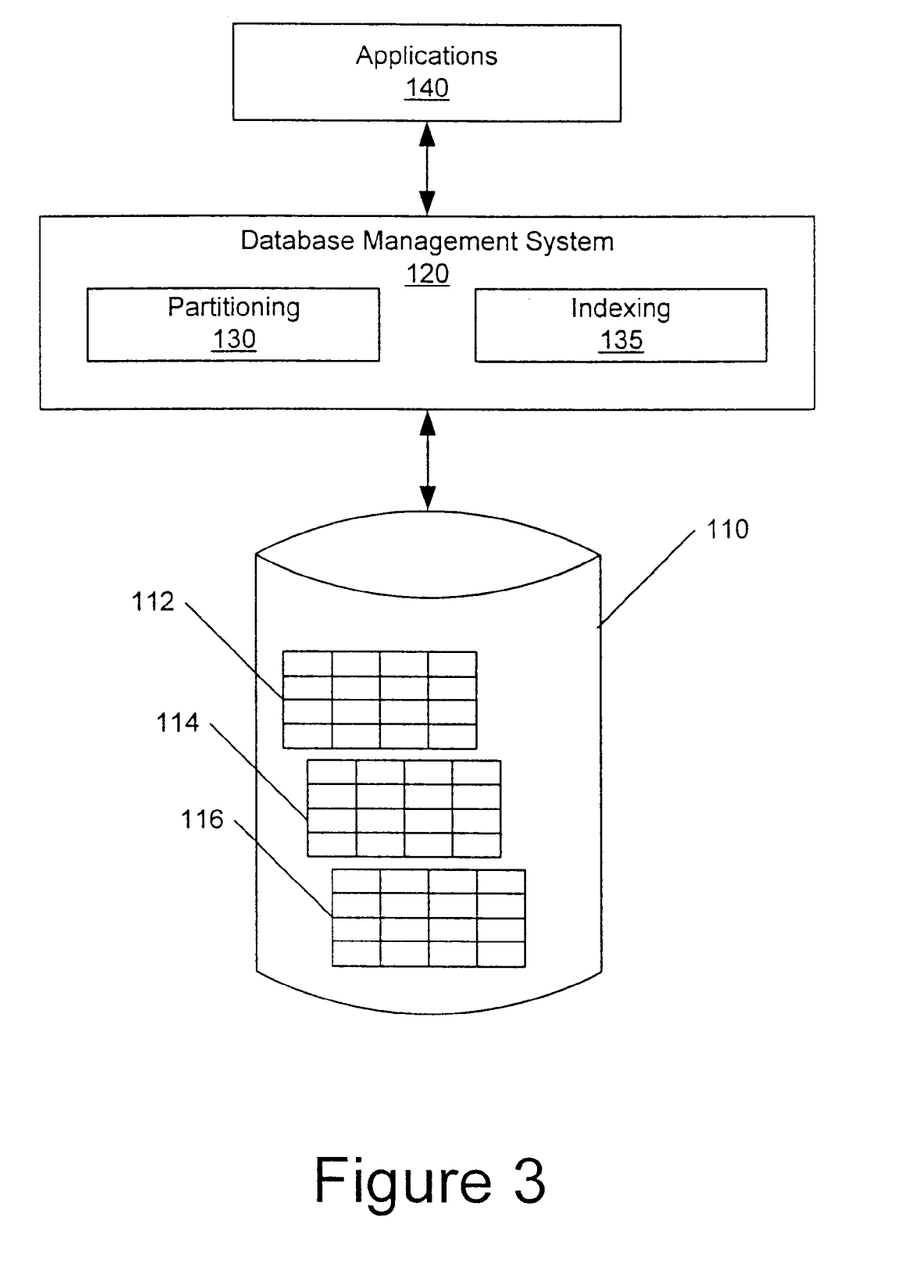
FIG. 3 is a block diagram of database systems, methods and computer program products according to embodiments of the present invention.

Referring now to FIG. 3, a block diagram of database systems, methods and computer program products according to embodiments of the present invention now will be described. As shown in FIG. 3, database systems, methods and computer program products 100 according to embodiments of the present invention include a database 110 having a plurality of tables 112, 114 and 116 and a database management system 120 which, among other things, enforces referential integrity between the plurality of tables and that includes a partitioning module or subsystem 130 that partitions the database utilizing indices that are defined according to the teachings of the present invention. The database management system 120 also includes an indexing module or subsystem 135 that indexes the partitioned tables 112, 114 and 116 based upon keys or super keys which are defined according to the teachings of the present invention. One or more other applications 140 may interface with the database management system 120, for example to support user queries. Elements 110, 120, 130, 135 and 140 may be embodied as part of an Oracle database management system and/or other database management system utilizing the keys and indices defined as described herein. These elements may be embodied in a lumped system, a distributed system and/or a client server system, and may be directly connected to one another or may be connected via a network including public and/or private, local and/or wide area networks such as the Internet.

Figure 4:
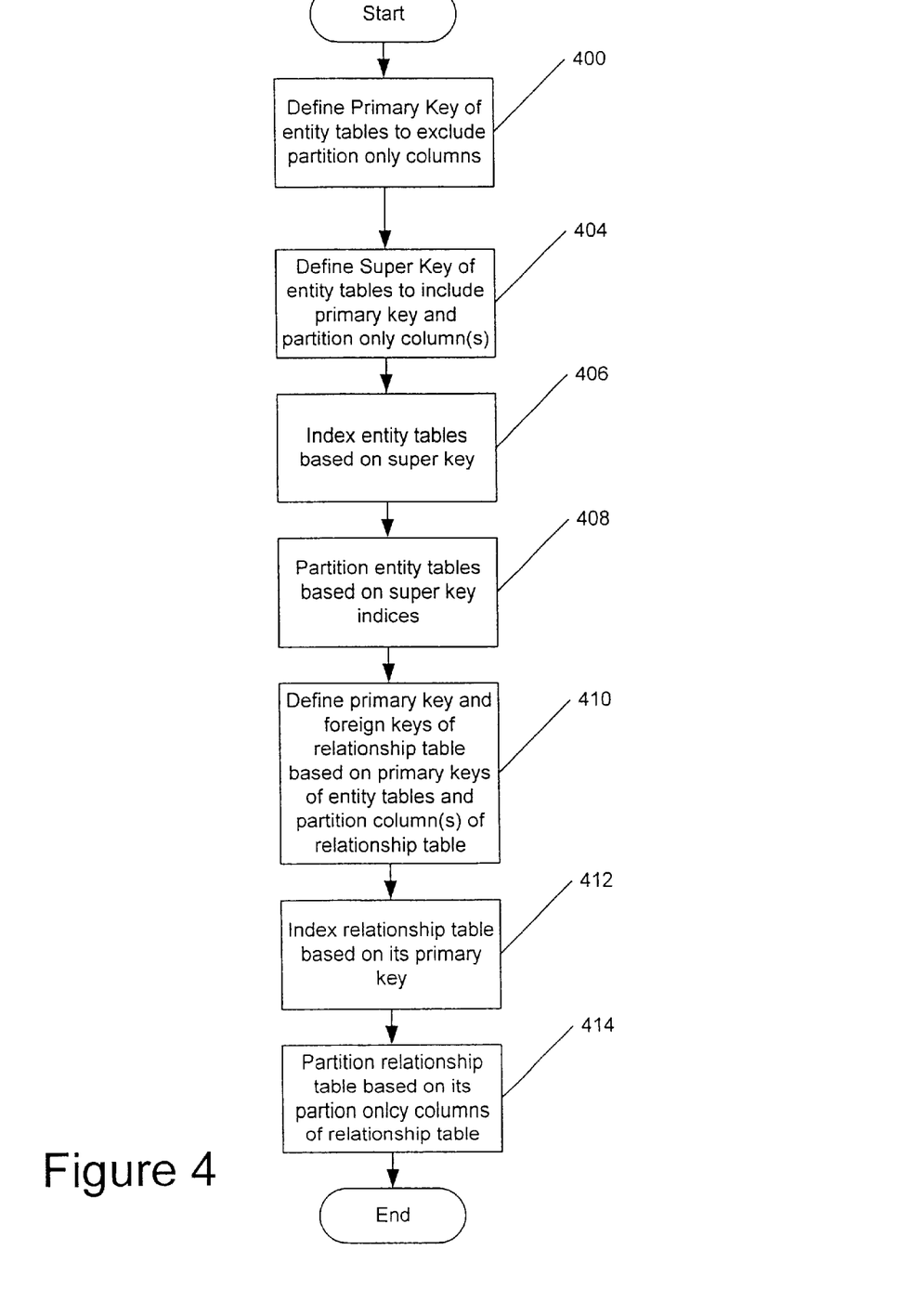
FIG. 4 is a flowchart of operations performed by embodiments of primary key and super key partitioning systems, methods and computer program products of FIG. 3.

FIG. 4 is a flowchart of operations performed in developing the database 110 and/or operations performed by the DBMS 120, the partitioning module 130 and/or the indexing module 135 according to embodiments of the present invention. FIG. 4 illustrates operations for defining keys and indices of partitioned tables of a relational database so that referential integrity between the partitioned tables may be maintained by the DBMS 120 by enforcing the child-parent relationship between entity tables and relationship tables utilizing the defined keys and indices even though the tables are partitioned. As seen in FIG. 4, primary keys for partitioned entity tables are defined so that the primary keys exclude columns of the entity tables which are used only for partitioning purposes (block 400), such columns are also referred to herein as "partition only columns." Furthermore, super keys are also defined for the entity tables where the super keys include the table's primary key and one or more columns which are used only for partitioning purposes (block 404). The tables are indexed, for example, by the indexing module 135, based on their super key (block 406) and are partitioned, for example, by the partitioning module 130, utilizing their super key index (block 408).

As is further illustrated in FIG. 4, a primary key and foreign keys for a relationship table which relates entries in at least two entity tables are also defined (block 410). The entries in the relationship table may define the many-to-many relationships between the entries in the entity tables. The primary key and foreign keys for the relationship table are defined based on the primary keys of the entity tables related by the relationship table. The foreign keys are defined to correspond to the primary keys of the entity tables, which do not include the partition only columns, and the primary key of the relationship table is defined to include the primary keys of the entity tables and at least one column of the relationship table used for partitioning the relationship table. The relationship table is also indexed based on its primary key (block 412) and partitioned based in its partition only columns (block 414).

As described above, partition criteria may be properly supported by the super key indices which may enable partitioning on very large tables with many-to-many relationships among. Through the use of the primary keys and foreign keys, referential integrity constraints can be properly enforced to maintain the consistency and, thus, the correctness of data. Such constraints may, typically, be enforced with the only additional run-time costs and storage costs being the result of building two additional indices which may be outweighed by the benefits of highly improved performance through table partitioning while allowing the DBMS 120 to enforce referential integrity. By allowing for partitioning of very large entity tables and the relationship tables which define the relationships between them, the performance of data manipulation and query operations on a VLDB can be greatly improved. Furthermore, embodiments of the present invention may provide such partitioning typically without requiring additional development cost other than those associated with declaring keys and indices as discussed above, nor need it increase system complexity, and may have minimal effect on run-time CPU overhead. Embodiments of the present invention also can hide the implementation details from database applications and, thus, typically do not require application modifications.

Figure 5:
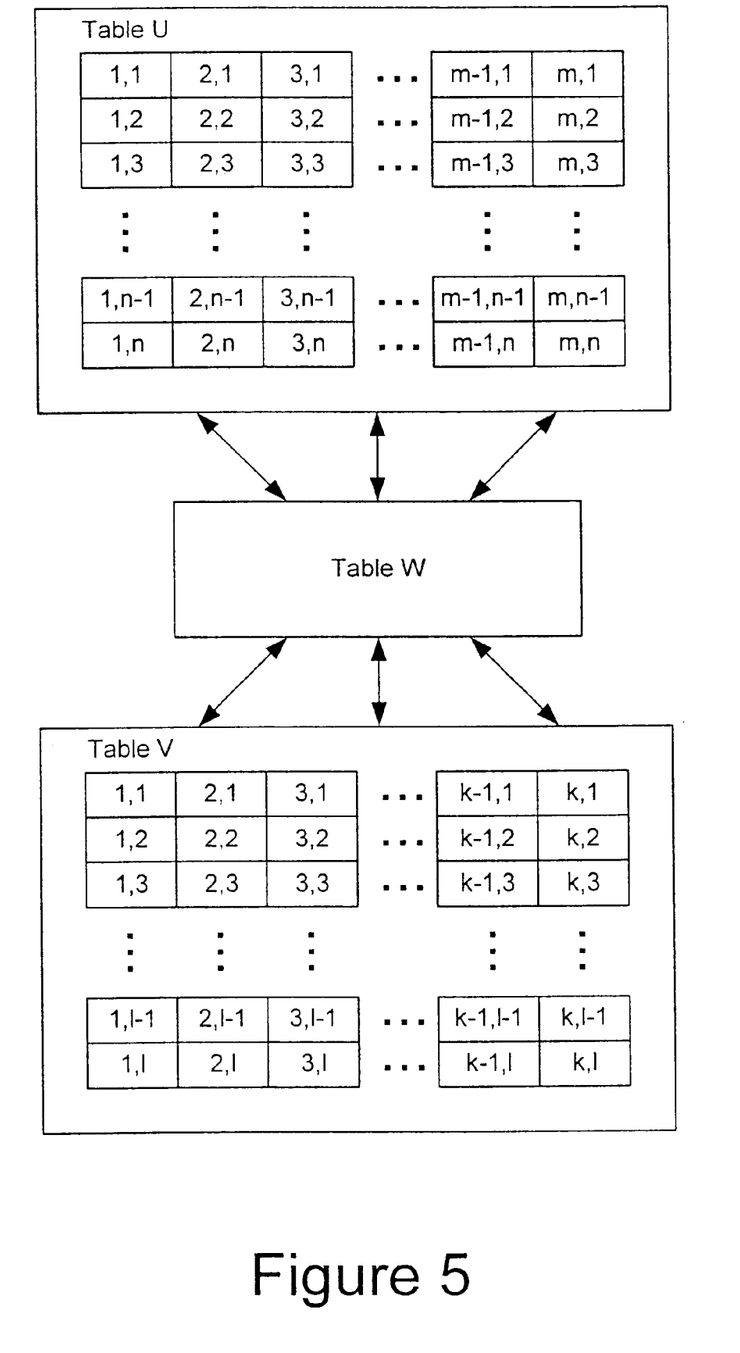
FIG. 5 is a block diagram of entity and relational tables according to embodiments of the present invention.
Figure 6:
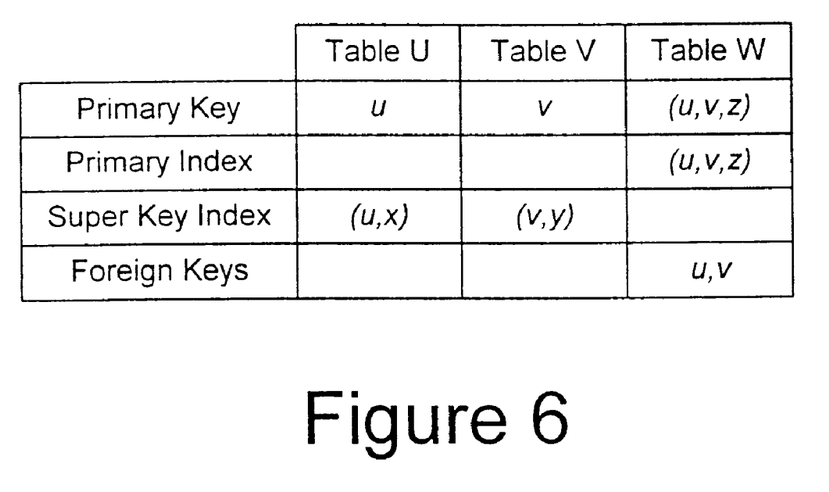
FIG. 6 is an illustration of primary keys, super keys and indexes for three partitioned tables according to embodiments of the present invention.

An example of two entity tables and a relationship table according to embodiments of the present invention is illustrated in FIGS. 5 and 6. FIG. 5 illustrates a first entity table, Table U, having m columns and n entries with m columns per entry. A second entity table, Table V, has k columns and l entries with k columns per entry. A given entry in Table U may be related to multiple entries in Table V and, likewise, a given entry in Table V may be related to multiple entries in Table U. These relationships are defined by entries in a relationship table, Table W. Table U, Table V and Table W are all partitioned tables.

According to embodiments of the present invention, primary keys are defined for each of Tables U, V and W and are a subset of the columns of the corresponding table. Thus, as seen in FIG. 6, Table U has a primary key u which is a subset of the columns of Table U, the values of which can uniquely identify each of the n entries in Table U. However, the primary key u does not include columns in Table U which are used only for partitioning Table U. Similarly, Table V has a primary key v which is a subset of the columns of Table V the values of which can uniquely identify each of the l entries in Table V. The primary key v does not include columns in Table V which are used only for partitioning Table V.

A super key is also defined for each of Tables U and V. The super key of Table U includes the primary key u of Table U and also includes the subset of columns which are used only for partitioning Table U. This subset of columns is represented by x in FIG. 6. Similarly, Table V has defined a super key which includes the primary key v of Table V and also includes the subset of columns which are used only for partitioning Table V. This subset of columns is represented by y in FIG. 6. Both Tables U and V also include a super key index based on their respective super keys, (u,x) and (v,y). Tables U and V are also partitioned based on their respective super key index.

The relationship table, Table W, also includes a primary key and further includes foreign keys which establish Table W as a child to both Table U and Table V. The foreign keys are defined as the primary keys, u and v, of Table U and V. The primary keys of Table W include the primary keys u and v of Tables U and V and also include the subset of columns of Table W used for partitioning Table W. This subset of columns is indicated in FIG. 6 as z. Thus, Table W has a primary key of (u,v,z) and is indexed and partitioned based on this primary key.

Embodiments of the present invention may be particularly well suited to partitioning entity tables and relationship tables in databases which contain network quality of service information such as are described in U.S. patent application Ser. No. 09/641,044, entitled "DATABASE SYSTEMS, METHODS AND COMPUTER PROGRAM PRODUCTS INCLUDING RECONFIGURABLE DYNAMIC TIME WINDOW MANAGEMENT" filed Aug. 17, 2000, the disclosure of which is incorporated herein by reference as if set forth fully herein.

An example of table definitions for partitioned tables having primary key and super keys defined according to embodiments of the present invention is illustrated below. The various super keys, primary keys and partition criteria have been identified in the following example.

An example of a definition for an entity table, such as Table U, may include the following:

```
CREATE TABLE ServiceAccessPoint (
    SapID       NUMBER (10) NOT NULL,
    PartNoA     NUMBER (10) NOT NULL, ← partition criterion
    SapName     VARCHAR2 (60) NOT NULL,
    SapDescr    VARCHAR2 (120) NULL,
    .
    .
    .
    PRIMARY KEY (SAPID)
)
PARTITION BY RANGE (PartNoA)
(
    PARTITION ServiceAccessPoint_P0
        VALUES LESS THAN (1),
    PARTITION ServiceAccessPoint_P1
        VALUES LESS THAN (2),
    PARTITION ServiceAccessPoint_P2
        VALUES LESS THAN (3),
    .
    .
    .
);
CREATE UNIQUE INDEX X_SAP_SapID_PartNo ON ServiceAccesspoint ← super key index
(
        SapID           ASC,
        PartNoA         ASC
);
```

An example of a second entity table, such as Table V, is illustrated by the following:

```
CREATE TABLE ServiceDescription (
    ServiceDescrID      NUMBER (10) NOT NULL,
    PartNoB             NUMBER (10) NOT NULL, ←partition criterion
    ServiceDescrName    VARCHAR2 (60) NOT NULL,
    .
    .
    .
```

```
        PRIMARY KEY (ServiceDescrID)
)
PARTITION BY RANGE (PartNoB)
(
        PARTITION ServiceDescription_P0
            VALUES LESS THAN (1),
        PARTITION ServiceDescription_P1
            VALUES LESS THAN (2),
        PARTITION ServiceDescription_P2
            VALUES LESS THAN (3),
            .
            .
            .
);
CREATE UNIQUE INDEX X_ServiceDescription_ID_PartNo ON
ServiceDescription  ← super key index
(
        ServiceDescrID      ASC,
        PartNoB             ASC
);
```

Finally, an example of relationship table, such as Table W, is provided by the following:

```
CREATE TABLE r_SapServiceDescription (
    SapID               NUMBER (10) NOT NULL,
    ServiceDescrID      NUMBER (10) NOT NULL,
    PartNoC             NUMBER (10) NOT NULL,  ← partition criterion
    DeviceID            NUMBER (10) NULL,
    .
    .
    .
    PRIMARY KEY (SapID, ServiceDescrID, PartNoC)
)
PARTITION BY RANGE (PartNoC)
    (
        PARTITION r_SapServiceDescription_P0
          VALUES LESS THAN (1),
        PARTITION r_SapServiceDescription_P1
          VALUES LESS THAN (2),
        PARTITION r_SapServiceDescription_P2
          VALUES LESS THAN (3),
          .
          .
          .
);
CREATE UNIQUE INDEX XPKr_SapServiceDescription ON
r_SapServiceDescription  ← primary index
(
        SapID               ASC,
        ServiceDescrID      ASC,
        PartNoC             ASC
);
ALTER TABLE r_SapServiceDescription
        ADD ( CONSTRAINT FK_rSapSerDes_SerDes FOREIGN KEY
(ServiceDescrID)
                    REFERENCES ServiceDescription ) ;
ALTER TABLE r_SapServiceDescription
    ADD ( CONSTRAINT FK_rSapSerDes_SerAccPoi FOREIGN KEY
(SapID)
                    REFERENCES ServiceAccesspoint ) ;
```

The flowcharts and block diagrams of FIGS. 3 through 6 illustrate the architecture, functionality, and operation of possible implementations of systems, methods and computer program products according to embodiments of the invention. In this regard, each block in the flowcharts or block diagrams can represent a module, segment, or portion of code, which comprises one or more executable instructions for implementing the specified logical function(s). It should also be noted that in some alternative implementations, the functions noted in the blocks may occur out of the order noted in the figures. For example, two blocks shown in succession may in fact be executed substantially concurrently or the blocks may sometimes be executed in the reverse order, depending upon the functionality involved.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A relational database system comprising:
   a database management system;
   a database having a plurality of partitioned tables, the plurality of partitioned tables including at least two entity tables and a relationship table, the relationship table having a child-to-parent relationship to each of the at least two entity tables; and
   a plurality of keys and indices that are defined for the entity tables and the relationship table and that are configured so that the database management system can maintain referential integrity between the relationship table and the at least two entity tables to thereby enforce the child parent relationship, wherein the plurality of keys and indices comprise:
      a primary key comprising one or more columns of a corresponding entity table other than columns which are used only for partitioning the entity table;
      a super key comprising the columns of the primary key of a corresponding entity table and one or more columns of the entity table which are used only for partitioning the entity table;
      a super key index of the corresponding entity table based on the super key;
      a primary key corresponding to the relationship table comprising the primary keys of the at least two entity tables and one or more columns of the relationship table used for partitioning the relationship table;
      a primary key index of the relationship table based on the primary key corresponding to the relationship table; and
      a plurality of foreign keys of the relationship table, each foreign key corresponding to a primary key of one of the at least two entity tables.

2. The relational database system of claim 1, wherein entries in the at least two entity tables have a many-to-many relationship with each other defined by entries in the relationship table.

3. The relational database system of claim 2, wherein data in the at least two entity tables comprises network quality of service information.

4. The relational database system wherein the partitioned database table comprises a first partitioned database table, the primary key comprises a first primary key and the super key comprises a first super key, the relational database further comprising:
   a partitioned database table;
   a second partitioned database table;
   a primary key of the database table, the primary key comprising one or more columns of the database table other than columns which are used only for partitioning the database table;
   a second primary key of the second database table, the second primary key comprising one or more columns of the second database table other than columns of the second database table used only for partitioning the second database table;
   a super key of the database table, the super key comprising the columns of the primary key and one or more columns of the database table which are used only for partitioning the database table;
   a second super key of the second database table, the second super key comprising the columns of the second primary key anal one or more columns of the database table which are used only for partitioning the database table;
   a super key index of the partitioned database table based on the super key;
   a super key index of the second partitioned database table based on the second super key;
   a third partitioned database table comprising a relationship table which relates entries in the first partitioned database table to entries in the second partitioned database table;
   a third primary key comprising the first primary key, the second primary key and one or more columns of the third partitioned database table used for partitioning the third partitioned database table; and
   an index of the third partitioned database table based on the one or more columns of the third portioned database table used for partitioning the third database table.

5. The relational database system of claim 4, wherein the first and second partitioned database tables are entity tables having entries with a many-to-many relationship defined by entries of the third partitioned database table.

6. The relational database system of claim 5, wherein the third partitioned database table further comprises a plurality of foreign keys, each foreign key corresponding to a primary key of one of the first and second entity tables.

7. The relational database system of claim 6, wherein data in the first and second partitioned tables comprises network quality of service information.

8. The relational database system of claim 6, wherein the first and second partitioned database tables are partitioned based on their respective super key indices.

9. A method of maintaining referential integrity between partitioned tables of a relational database, the method comprising:
   defining primary keys of at least two entity tables of the relational database so as to only include columns of the at least two entity tables other than columns used only for partitioning the respective entity tables of the at least two entity tables;
   defining super keys of the at least two entity tables of the relational database so as to include the respective primary keys and at least one column used only for partitioning the respective entity tables;
   defining super key indices for the at least two entity tables based on their respective super keys;
   defining a primary key of a relationship table associated with the at least two entity tables based on the primary keys of the at least two entity tables and at least one column of the relationship table used for partitioning the relationship table; and
   defining an index of the relationship table based on the at least one column of the relationship table used for partitioning the relationship table.

10. The method of claim 9, further comprising the step of partitioning the at least two entity tables based on their respective super key indices.

11. The method of claim 10, further comprising partitioning the relationship table based on its primary key index.

12. The method of claim 9, further comprising the step of enforcing referential integrity between the at least two entity tables and the relationship table based on their respective primary keys.

13. The method of claim 12, wherein entries in the at least two entity tables have a many-to-many relationship defined by entries in the relationship table.

14. The method of claim 13, further comprising defining foreign keys of the relationship table to correspond to the primary keys of the entity tables related by the relationship table.

15. A system for maintaining referential integrity between partitioned tables of a relational database, comprising:

means for defining primary keys of at least two entity tables of the relational database so as to only include columns of the at least two entity tables other than columns used only for partitioning the respective entity tables of the at least two entity tables;

means for defining super keys of the at least two entity tables of the relational database so as to include the respective primary keys and at least one column used only for partitioning the respective entity tables;

means for defining super key indices for the at least two entity tables based on their respective super keys;

means for defining a primary key of a relationship table associated with the at least two entity tables based on the primary keys of the at least two entity tables and at least one column of the relationship table used for partitioning the relationship table; and means for defining an index of the relationship table based on the at least one column of the relationship table used for partitioning the relationship table.

16. The system of claim 15, further comprising means for partitioning the at least two entity tables based on their respective super key indices.

17. The system of claim 16, further comprising means for partitioning the relationship table based on its primary key index.

18. The system of claim 15, further comprising means for enforcing referential integrity between the at least two entity tables and the relationship table based on their respective primary keys.

19. The system of claim 18, wherein entries in the at least two entity tables have a many-to-many relationship defined by entries in the relationship table.

20. The system of claim 19, further comprising means for defining foreign keys of the relationship table to correspond to the primary keys of the entity tables related by the relationship table.

21. A computer readable program code which defines for maintaining referential integrity between partitioned tables of a relational database, the method comprising:

a computer readable media having computer readable program code embodied therein, the computer readable program code comprising:

computer readable program code which defines primary keys of at least two entity tables of the relational database so as to only include columns of the at least two entity tables other than columns used only for partitioning the respective entity tables of the at least two entity tables;

computer readable program code which defines super keys of the at least two entity tables of the relational database so as to include the respective primary keys and at least one column used only for partitioning the respective entity tables;

computer readable program code which defines super key indices for the at least two entity tables based on their respective super keys; computer readable program code which defines a primary key of a relationship table associated with the at least two entity tables based on the primary keys of the at least two entity tables and at least one column of the relationship table used for partitioning the relationship table; and computer readable program code which defines an index of the relationship table based on the at least one column of the relationship table used for partitioning the relationship table.

22. The computer program product of claim 21, further comprising the computer readable program code which partitions the at least two entity tables based on their respective super key indices.

23. The computer program product of claim 22, further comprising computer readable program code which partitions the relationship table based on its primary key index.

24. The computer program product of claim 21, further comprising the computer readable program code which enforces referential integrity between the at least two entity tables and the relationship table based on their respective primary keys.

25. The computer program product of claim 24, wherein entries in the at least two entity tables have a many-to-many relationship defined by entries in the relationship table.

26. The computer program product of claim 25, further comprising computer readable program code which defines foreign keys of the relationship table to correspond to the primary keys of the entity tables related by the relationship table.

* * * * *